(12) United States Patent
Shnaiderman et al.

(10) Patent No.: US 11,585,558 B2
(45) Date of Patent: Feb. 21, 2023

(54) AIR QUALITY MANAGEMENT DEVICE, AN AIR QUALITY CONTROL SYSTEM, AND A METHOD FOR CONTROLLING AIR QUALITY

(71) Applicant: AURA SMART AIR LTD, Azur (IL)

(72) Inventors: Aviad Shnaiderman, Yehud (IL); Eldar Shnaiderman, Tel Aviv (IL)

(73) Assignee: AURA SMART AIR LTD, Azur (IL)

( * ) Notice: Subject to any disclaimer, the term of this patent is extended or adjusted under 35 U.S.C. 154(b) by 136 days.

(21) Appl. No.: 16/969,243

(22) PCT Filed: Jan. 21, 2019

(86) PCT No.: PCT/IL2019/050077
§ 371 (c)(1),
(2) Date: Aug. 12, 2020

(87) PCT Pub. No.: WO2019/186527
PCT Pub. Date: Oct. 3, 2019

(65) Prior Publication Data
US 2021/0003310 A1    Jan. 7, 2021

Related U.S. Application Data

(60) Provisional application No. 62/649,595, filed on Mar. 29, 2018.

(51) Int. Cl.
*F24F 11/64*     (2018.01)
*F24F 11/30*     (2018.01)
(Continued)

(52) U.S. Cl.
CPC ............. *F24F 11/64* (2018.01); *F24F 8/10* (2021.01); *F24F 8/108* (2021.01); *F24F 8/158* (2021.01);
(Continued)

(58) Field of Classification Search
CPC ...................................... F24F 8/158
See application file for complete search history.

(56) References Cited

U.S. PATENT DOCUMENTS 7,389,158 B2    6/2008  Desrochers et al.
2004/0117330 A1*  6/2004  Ehlers ............... H04L 67/12
705/412

(Continued)

FOREIGN PATENT DOCUMENTS

CN    203336773 U    12/2013
WO    WO 2017/063557    4/2017

OTHER PUBLICATIONS

Search Report of European Application No. EP19776761.9 dated Feb. 9, 2021.
(Continued)

*Primary Examiner* — Nathan L Laughlin
(74) *Attorney, Agent, or Firm* — Pearl Cohen Zedek Latzer Baratz LLP

(57) ABSTRACT

The present invention relates to an air quality monitoring and controlling system and method for enclosed spaces, which provides an innovative closed loop (i.e., inline real time feedback) air management process, utilizing learning and prediction capabilities to provide with effective air purification and reliable alerting when required.

14 Claims, 4 Drawing Sheets

(51) Int. Cl.
  *F24F 8/10*   (2021.01)
  *F24F 8/158*  (2021.01)
  *F24F 8/108*  (2021.01)
  *F24F 110/64* (2018.01)
  *F24F 110/72* (2018.01)
  *F24F 110/66* (2018.01)
  *F24F 8/22*   (2021.01)

(52) U.S. Cl.
  CPC ............... *F24F 11/30* (2018.01); *F24F 8/22* (2021.01); *F24F 2110/64* (2018.01); *F24F 2110/66* (2018.01); *F24F 2110/72* (2018.01)

(56) References Cited

U.S. PATENT DOCUMENTS

| | | | |
|---|---|---|---|
| 2006/0032260 A1* | 2/2006 | Kang ............... | F24F 1/0067 |
| | | | 62/298 |
| 2013/0239803 A1 | 9/2013 | Palmer | |
| 2014/0139342 A1* | 5/2014 | Brown ............... | G08B 21/12 |
| | | | 340/603 |
| 2016/0116181 A1 | 4/2016 | Aultman et al. | |
| 2016/0356519 A1 | 12/2016 | Choi | |
| 2017/0167744 A1* | 6/2017 | Arensmeier ............ | F24F 11/30 |
| 2017/0328590 A1 | 11/2017 | Ke et al. | |
| 2018/0227141 A1* | 8/2018 | Zribi ............... | H04L 12/2825 |
| 2020/0141604 A1* | 5/2020 | Chen ............... | F24F 11/65 |

OTHER PUBLICATIONS

International Search Report and Written Opinion of PCT International Application No. PCT/IL2019/050077 dated Apr. 15, 2019.

* cited by examiner

AIR QUALITY MANAGEMENT DEVICE, AN AIR QUALITY CONTROL SYSTEM, AND A METHOD FOR CONTROLLING AIR QUALITY

CROSS-REFERENCE TO RELATED APPLICATIONS

This application is a National Phase Application of PCT International Application No. PCT/IL2019/050077, International Filing Date Jan. 21, 2019, entitled AN AIR QUALITY MANAGEMENT DEVICE, AN AIR QUALITY CONTROL SYSTEM, AND A METHOD FOR CONTROLLING AIR QUALITY, published on Oct. 3, 2019 as International Patent Application Publication No. WO 2019/186527, claiming the benefit of U.S. Provisional Patent Application No. 62/649,595, filed on Mar. 29, 2018, which is hereby incorporated by reference.

FIELD OF THE INVENTION

The invention is in the field of indoor air quality systems. More particularly, the present invention relates to an integrated air quality control system.

BACKGROUND OF THE INVENTION

The monitoring of air quality in enclosed spaces requires the use of multiple different sensors, e.g., smoke detectors, LPG (liquid petroleum gas) and CO (carbon monoxide) sensors, while each type of sensor has specific characteristics, and therefore, its particular work conditions and feasible applications. Similarly, multiple different air filters may be required for the reduction of unwanted airborne substances to a desirable level, wherein each type of filter has its specific characteristics, for example, coarse filters for large sized particles vs. fine filters.

The operation of existing air quality monitoring and control systems is generally focused on monitoring and controlling of particulate sizes, and do not provide highly reliable monitoring and controlling of air pollution and hazardous substances, resulting with false alarms, and late detection.

The present invention utilizes the progress in the IOT and AI fields for an advanced prediction capability, which provides a solution to the abovementioned disadvantages of the prior art.

SUMMARY OF THE INVENTION

An air quality management device, comprising:
a) at least one sensor;
b) at least one air quality control means;
c) at least one air blowing unit;
d) a communication module; and
e) a controller that is configured to receive measured/detected parameters from said at least one sensor, to process said receive measured/detected parameters and accordingly to control said blower and the air quality control means and to communicate with one or more external units via the communication module.

According to an embodiment of the invention, the at least one air blowing unit is configured to stream fresh or outdoor air.

According to an embodiment of the invention, the air quality control means are selected from the group consisting of: a dust filter, a charcoal filter, HEPA filter, an ionizer, a UV lamp, or any combination thereof.

According to an embodiment of the invention, the air quality control means comprises at least one filtration arrangement that combines a HEPA filter, an active carbon based filter and a fabric-based bio filter which contains copper.

According to an embodiment of the invention, at least one of the air quality control means is installed within the path of an airstream blown by the at least one air blowing unit or externally to said device.

According to an embodiment of the invention, the sensors are selected from the group consisting of: fire/smoke sensors, CO sensors, $CO_2$ sensors, Volatile Organic Compounds (VOC) sensors, LPG sensor, Radon sensors, dust sensors, Nitrogen Oxide ($NO_x$) sensors, thermometers, barometers, or any combination thereof.

According to an embodiment of the invention, the sensors are installed within the device, on an exterior enclosure of the device, or in an indoor or outdoor remote location.

According to an embodiment of the invention, the controller compares real time sensors and operational parameters with expected parameters to produce a maintenance warning or an alert.

According to an embodiment of the invention, operational and measured/detected parameters are analyzed by applying an air quality algorithm to identify trends and developing unwanted situations, and the most efficient response, based on historical stored data, followed with perpetual update of the preset pre-programmed scenarios.

According to an embodiment of the invention, the communication module is used for communicating with remote stations to allow remote monitoring, remote control and alerting.

In another aspect, the present invention relates to an air quality management system, comprising:
a) at least one air quality management device adapted to receive data from one or more sensors, to process said received data and accordingly to perform one or more air quality related tasks; and
b) a remote station configured to communicate with said at least one air quality management device, wherein each air quality management device uploads the received data to said remote station, to analyze the received data and to update pre-programmed scenarios and real time/predictive maintenance notifications to each air quality management device.

According to an embodiment of the invention, the at least one air quality management device comprises at least one air quality control means and at least one air blowing unit.

According to an embodiment of the invention, the received data from the at least one air quality management device further comprises operational data received from the at least one air quality control means and the at least one air blowing unit.

In another aspect, the present invention relates to a method for controlling air quality, comprising:
a) receiving data from one or more sensors related to at least one air quality management device;
b) processing said received data and accordingly performing one or more air quality related tasks; and
c) analyzing the received data and updating pre-programmed scenarios and real time/predictive maintenance notifications to the at least one air quality management device.

DETAILED DESCRIPTION OF THE DRAWINGS

Figure 1:
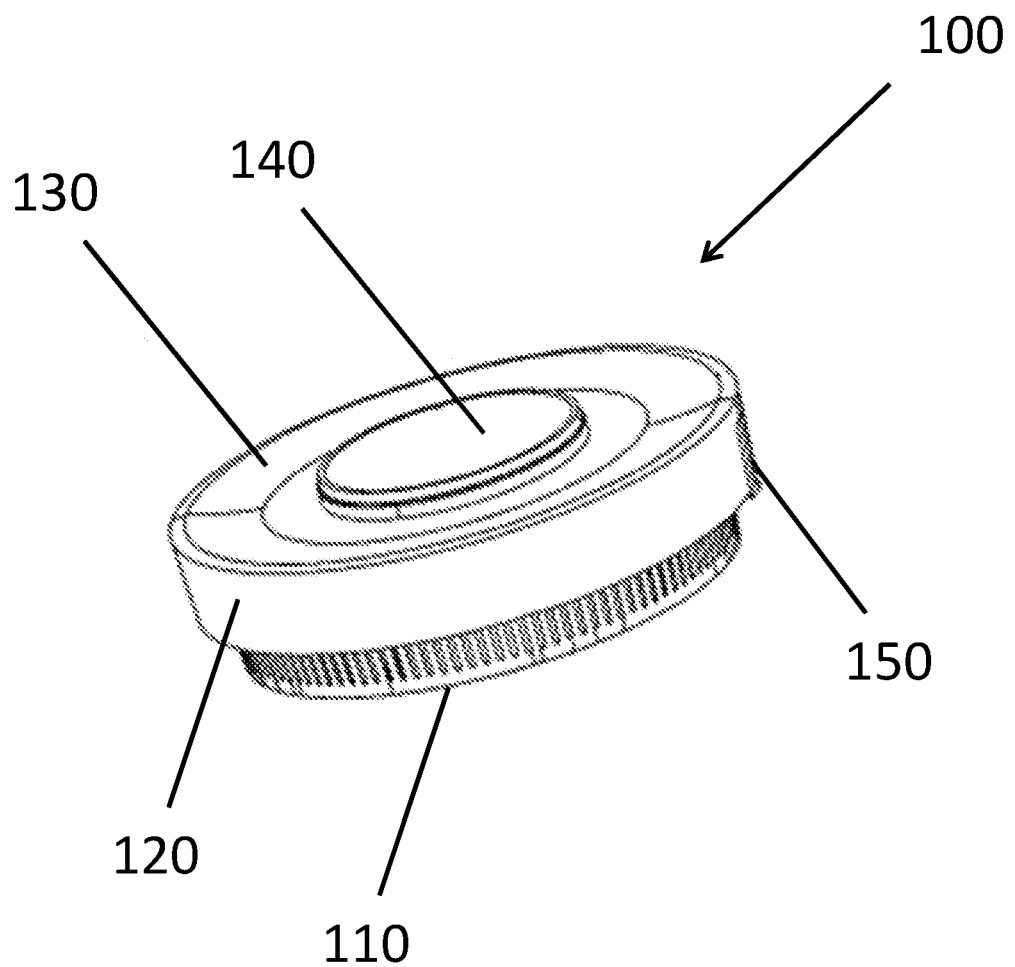
FIG. 1 schematically illustrates a perspective view of an embodiment of the present invention.

The present invention relates to an air quality monitoring and controlling system and method for enclosed spaces (e.g., homes, offices, hospitals, transport systems such as planes and buses among other transport systems), which provides an innovative closed loop (i.e., inline real time feedback) air management process, utilizing learning and prediction capabilities to provide with effective air purification and reliable alerting when required.

According to an embodiment of the present invention, the system is comprised of at least one air management device and at least one computing unit (i.e., which can be integrated with the air management device controller or can be an external computer which communicates with the device's controller) which runs an innovative software.

In one embodiment of the present invention, the air management device is comprised of air quality sensors, air quality control means, at least one controllable blower, a controller, alerting module (embedded or external to the system) and at least one communication module, wherein the controller can receive measured/detected parameters from the sensors and accordingly to control the blower, air quality control means and the alerting and communication modules, by utilizing pre-programmed scenarios together with learning and prediction algorithms.

In one embodiment of the present invention, multiple air quality control means are used (e.g., a dust filter, a charcoal filter, a High Efficiency Particulate Arrestor (HEPA) filter, an ionizer and a UV lamp), wherein the filters, UV lamp and ionizer are installed inside the system's housing within the airstream blown by aforesaid blower.

According to some embodiments of the present invention, the air quality control means comprises a filtration arrangement that combines the following layers:
a HEPA filter;
an active carbon based filter; and
a bio-filter adapted for filtering and elimination of microscopic viruses, bacteria and fungus, such as a fabric-based bio filter that comprises copper, e.g., as disclosed by Borkow G. et. al. "Putting copper into action: copper-impregnated products with potent biocidal activities", FASEB J. 2004 November; 18(14):1728-30. Epub 2004 Sep. 2, and as disclosed by Borkow G. et. al. "Neutralizing Viruses in Suspensions by Copper Oxide-Based Filters", Antimicrobial Agents and Chemotherapy June 2007, 51 (7) 2605-2607.

In another embodiment of the present invention, the ionizer is installed outside the system's housing.

In an embodiment of the present invention, multiple air quality sensors are used (e.g., fire/smoke sensor, CO sensor, $CO_2$ sensor, Volatile organic compounds (VOC) sensor, e.g., Formaldehyde sensor, Liquefied Petroleum Gas (LPG) sensor, Radon sensor, a dust sensor such as PM2.5 or PM10, Nitrogen Oxide ($NO_x$) sensor, thermometer, barometer) for creating a combined map of measured/detected air quality parameters, and the sensors are located inside the system's housing to measure/detect the level/presence of airborne substances in the streamed air by the aforesaid blower, upstream and downstream of the air quality control means.

In another embodiment, at least one thermometer is installed outside the system's housing being directly exposed to the ambient temperature within the enclosed space (e.g., house) and one thermometer is installed outside the enclosed space (i.e., located outdoor), being exposed to the external temperature.

FIG. 1 schematically illustrates a perspective view of an air quality management device 100 in accordance with an embodiment of the present invention, showing a device's 100 enclosure, comprised of a rear cover (not shown), a base unit 110, an external ring 120, a removable cover 130, a forward cover 140, and a dust sensor 150 with a combined ionizer.

Figure 2:
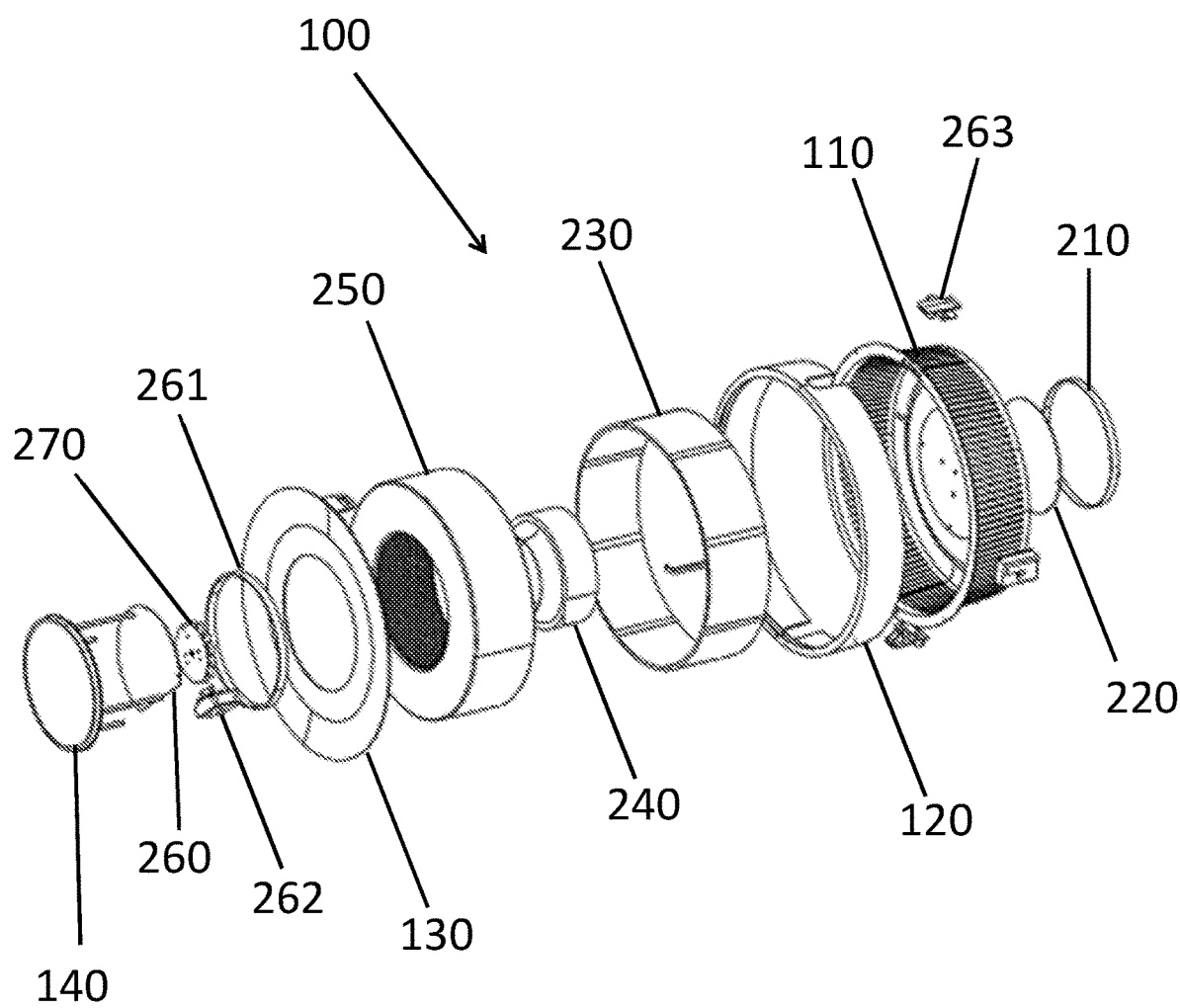
FIG. 2 schematically shows an exploded view of an embodiment of the present invention.

FIG. 2 schematically illustrates an exploded view of device 100, according to an embodiment of the present invention, in which device 100 is comprised of a rear cover 210, a power supply unit 220, a base unit 110, an external ring 120 which fits over the base unit, a charcoal filter 230 which fits inside the ring 120, an electrical blower 240 (e.g., centrifugal fan) which fits inside a HEPA filter 250, where the HEPA filter 250 fits inside charcoal filter 230 and a removable cover 130 to cover the ring and its contents. The embodiment of FIG. 1 comprises of a first dust filter 261, a first dust sensor 262 which fits inside dust filter 261, a UV lamp 270, a controller 260 which controls operation of the first dust sensor 261, of a second dust sensor 263, UV lamp 270 and blower 240. A forward cover 140 covers over first dust filter 262, first dust sensor 261, UV lamp 270 and connecting wiring. The second dust sensor 263 includes an ionizer and is located at the air outlet of the device.

Figure 3:
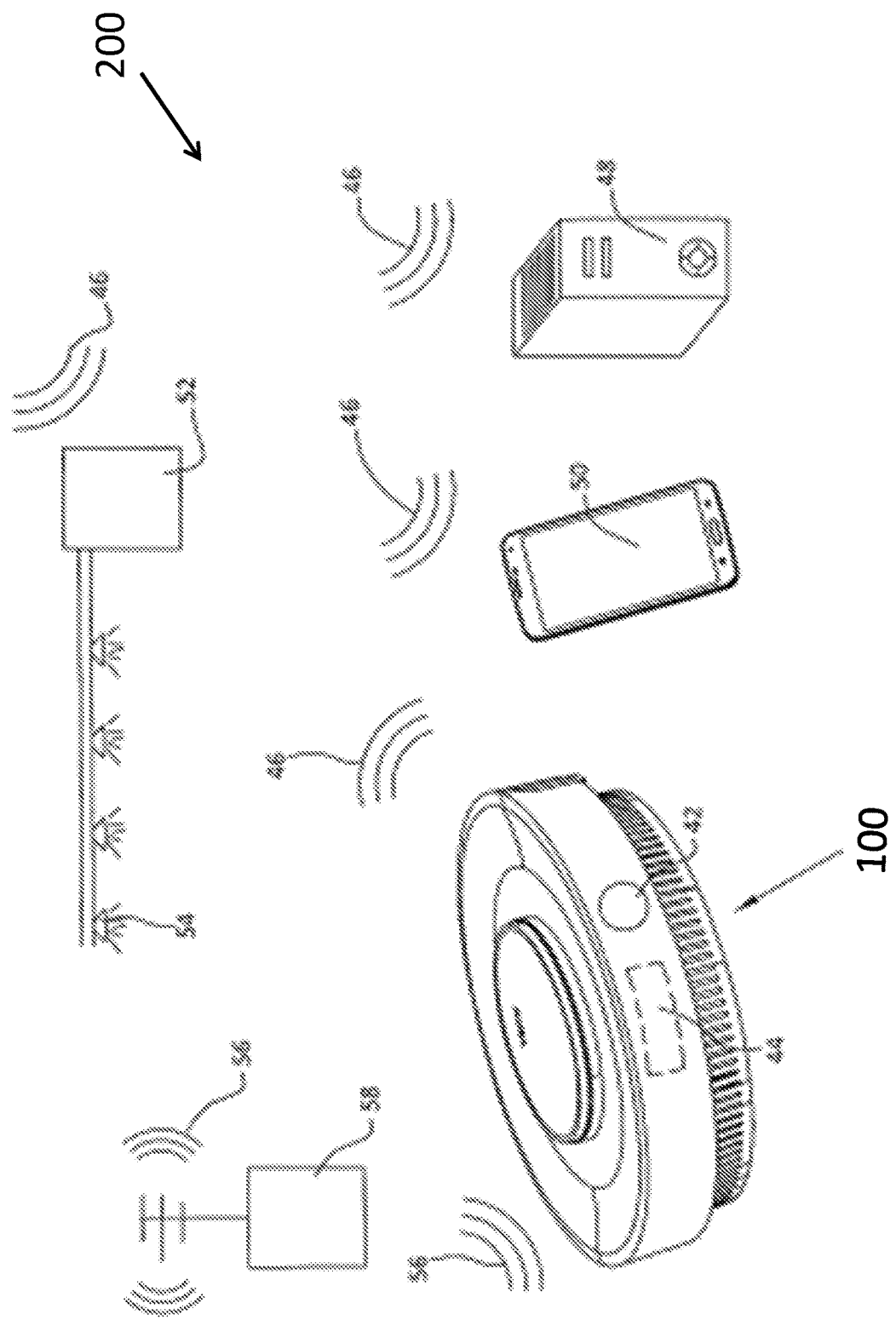
FIG. 3 schematically illustrates an air quality control system, according to an embodiment of the present invention.

FIG. 3 schematically illustrates an air quality control system 200, according to an embodiment of the present invention. System 200 may comprise at least one air quality management device 100 that is configured to communicate (in a wired and/or wireless manner) with one or more external units such as a computer 48, a mobile device 50, a controller 52, an external monitoring unit 58 or other external sources, etc. According to an embodiment of the invention, air quality management device 100 may communicate with the external unit via a wireless data network (e.g., via transceiver 44). For example, air quality management device 100 may generate an alert that may cause controller 52 to open valves and/or fire sprinklers 58, receive data 56 from external monitoring unit 58, etc.

Of course, continuous development of current and new air quality sensors and air quality management devices offers various and advanced detection, measuring and air purification capabilities through time. The present invention is not limited to the utilization of the above sensors and air quality control/purification device.

In an embodiment of the present invention, an inclusive map of the measured/detected air quality parameters collected by aforesaid air management device's sensors, combined with the current operational parameters of air quality control means, are stored and processed by the system's computing unit, which may react with:
real time operation (i.e., tasks for controlling air quality), wherein operational commands (e.g., activation, deactivation, adjustment or operational script) are sent through the device's controller to the blower, the air quality control means, the alert and communication modules—per a suitable pre-programmed scenario;
system health monitoring—comparing real time and expected air quality parameters to alert on system malfunctions, for example an unusual flow rate difference before and after a HEPA filter would set off a filter maintenance/replacement warning; and learning step, in which the inclusive operational and measured/detected parameters are analyzed, utilizing an algorithm to identify trends and evolving situations, based on historical stored data, followed with a perpetual update of the preset pre-programmed scenarios. For example, a moderate increase of smoke and CO levels (e.g., at a cooking area) for a limited period of time would set off the fire alarm at a first occurrence, but at the next occurrences the preset scenario will be updated so that a moderate increase of smoke and CO levels for a short time, detected by smoke sensor at the cooking area would result with a slight increase of the blower speed with no activation of the alarm. In some embodiments of the present invention, the learning step involves personalized data relative to a specific user, such as personal thermal preferences of a user with respect to indoor environmental conditions, user's habits in a specific indoor location where air quality management device 100 is installed, etc. For example, thermal preferences of a user may include a number of environmental parameters which are interrelated with each other and which are directly or indirectly influencing the user's well-being, such as ambient air temperature, mean radiant temperature, relative humidity, thermal radiation, the speed of air passing through the room as well as human activity, gender, etc.

In an embodiment of the present invention, the air management device is installed in an enclosed space near to a peripheral wall with a duct or an opening, allowing the blower, or an additionally installed blower to blow in air from outside the enclosed space if the sensors measure that the quality of the external air is higher, and allowing the device's controller to reduce or to completely stop the outside air flow, if the sensors measure a lower air quality in the external air.

According to an embodiment of present invention, the air management device is comprised of wired communication module (e.g., Ethernet LAN communication, land telephone line), which allows the device's computing units to communicate with remote stations in one or more of the following operation modes:

a local cooperation mode—in which the system cooperates with other building systems (e.g., air conditioning, fire alarm systems, gas and water supply valves, electricity breakers), or with distributed sensors, or ionizers of the system within same enclosed space. For example in a detected fire event, the system's computer would send a deactivation command to the building's air conditioning system, a shutoff command to the gas supply valves and to the non-critical electricity breakers and an activation command to the building's fire alarm system;

a remote control mode—in which the device of the present invention is remotely controlled, i.e., receives operational commands from a remote station (e.g., a remote computer, a central server, an authorized mobile phone user with a suitable application, a remote support center), for example, for remote testing by the service company.

cloud monitoring and learning—where the device of the present invention uploads measured/detected air quality to a remote station (e.g., a remote computer, a central server, an authorized mobile phone user with a suitable application, a remote support center), enabling a real time monitoring and processing of the inclusive information uploaded by the system of the present invention.

Of course, continuous development of current and new communication technologies offers various and advanced communication devices through time. The present invention is not limited to the utilization of specific existing wired or wireless communication devices (e.g., LAN, Wi-Fi, GSM, Fibers) and relevant infrastructure.

In an embodiment of the present invention, plural distributed air management devices consistently upload the operational data (e.g., geographic location, blower speed, ionizer ions release rate, UV on/off and intensity) together with measured parameters (i.e., CO level, dust level, smoke/LPG detection) to a central server, in which an innovative algorithm is utilized to analyze the mass data, allowing an advanced learning (e.g. detection of trends leading to hazardous situations, or to a lower air quality and identifying of most effective response for various scenarios) followed by a download of relevant updated pre-programmed scenarios, to each of said plural distributed devices. Additional algorithm is utilized to identify operational trends and improve the devices' predicted maintenance (i.e., identifying HEPA filter efficiency reduction is detected after a curtain average period, followed by an appropriate service alerts to the service personnel of systems with the HEPA filter.

Figure 4:
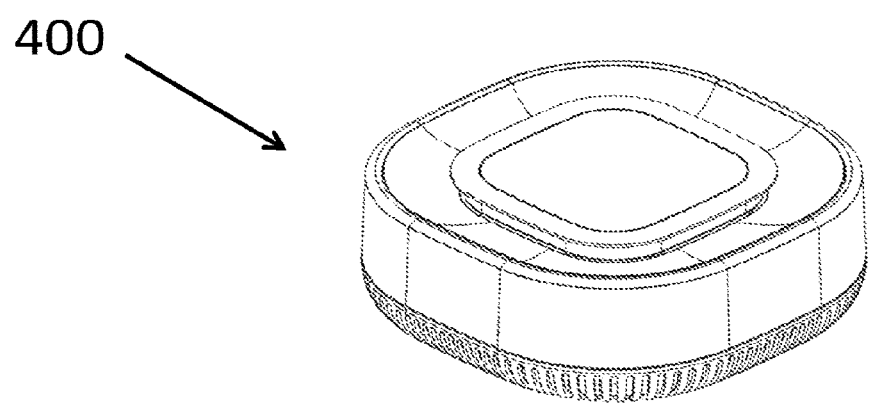
FIG. 4 schematically illustrates a perspective view of an air quality management device, according to another embodiment of the present invention.

FIG. 4 schematically illustrates a perspective view of an air quality management device 400, according to an embodiment of the present invention. In this embodiment, device 400 is of a rounded square design.

Although embodiments of the invention have been described by way of illustration, it will be understood that the invention may be carried out with many variations, modifications, and adaptations, without exceeding the scope of the claims.

The invention claimed is:

1. An air quality management device, comprising:
   a) at least one sensor;
   b) at least one air quality control means;
   c) at least one air blowing unit;
   d) a communication module; and
   e) a controller that is configured to: receive measured/detected parameters from said at least one sensor; process said receive measured/detected parameters and accordingly to control said blower and said air quality control means in accordance with one or more pre-programmed scenarios; to communicate with one or more external units via said communication module; and control building air conditioning, fire alarm systems, gas and water supply valves, and electricity breakers in accordance with the one or more pre-programmed scenarios,
   wherein measured/detected parameters are analyzed by an air quality algorithm to identify, based on historical stored data, trends and developing unwanted situations, and learn which trends are indicative of false alarms, followed with perpetual update of the one or more pre-programmed scenarios to reduce false alarms.

2. The device of claim 1, wherein the at least one air blowing unit is configured to stream fresh or outdoor air.

3. The device of claim 1, wherein the air quality control means are selected from the group consisting of: a dust filter, a charcoal filter, HEPA filter, an ionizer, a UV lamp, or any combination thereof.

4. The device of claim 1, wherein the air quality control means comprises at least one filtration arrangement that combines a HEPA filter, an active carbon based filter and a fabric-based bio filter which contains copper.

5. The device of claim 1, wherein at least one of the air quality control means is installed within the path of an airstream blown by the at least one air blowing unit or externally to said device.

6. The device of claim 1, wherein the sensors are selected from the group consisting of: fire/smoke sensors, CO sensors, CO2 sensors, Volatile Organic Compounds (VOC) sensors, LPG sensor, Radon sensors, dust sensors, Nitrogen Oxide (NOx) sensors, thermometers, barometers, or any combination thereof.

7. The device of claim 5, wherein the sensors are installed within the device, on an exterior enclosure of the device, or in an indoor or outdoor remote location.

8. The device of claim 1, wherein the controller compares real time sensors and operational parameters with expected parameters to produce a maintenance warning or an alert.

9. The device of claim 1, wherein operational and measured/detected parameters are analyzed by applying an air quality algorithm to identify trends and developing unwanted situations, and the most efficient response, based on historical stored data, followed with perpetual update of the preset preprogrammed scenarios.

10. The device of claim 1, wherein the communication module is used for communicating with remote stations to allow remote monitoring, remote control and alerting.

11. An air quality management system, comprising:
a) at least one air quality management device adapted to receive data from one or more sensors, to process said received data and accordingly to perform one or more air quality related tasks, and to control building air conditioning, fire alarm systems, gas and water supply valves, and electricity breakers; and
b) a remote station configured to communicate with said at least one air quality management device, wherein each air quality management device uploads the received data to said remote station, to analyze the received data and to update pre-programmed scenarios and real time/predictive maintenance notifications to each air quality management device,
wherein the received data is analyzed by an air quality algorithm to identify, based on historical stored data, trends and developing unwanted situations, and learn which trends are indicative of false alarms, followed with perpetual update of the pre-programmed scenarios to reduce false alarms.

12. The system according to claim 11, in which the at least one air quality management device comprises at least one air quality control means and at least one air blowing unit.

13. The system according to claim 11, in which the received data from the at least one air quality management device further comprises operational data received from the at least one air quality control means and the at least one air blowing unit.

14. A method for controlling air quality, comprising:
a) receiving data from one or more sensors related to at least one air quality management device;
b) processing said received data and accordingly performing one or more air quality related tasks;
c) analyzing the received data and updating pre-programmed scenarios and real time/predictive maintenance notifications to the at least one air quality management device, wherein the received data is analyzed by an air quality algorithm to identify, based on historical stored data, trends and developing unwanted situations, and learn which trends are indicative of false alarms, followed with perpetual update of the pre-programmed scenarios to reduce false alarms; and
d) controlling building air conditioning, fire alarm systems, gas and water supply valves, and electricity breakers in accordance with the pre-programmed scenarios.

* * * * *